United States Patent
Katihar et al.

(10) Patent No.: US 9,430,214 B2
(45) Date of Patent: Aug. 30, 2016

(54) SYSTEM UPGRADE UNDER HIGH AVAILABILITY CONSTRAINTS

(71) Applicant: TELEFONAKTIEBOLAGET L M ERICSSON (PUBL), Stockholm (SE)

(72) Inventors: Ekansh Singh Katihar, Montreal (CA); Maria Toeroe, Montreal (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 582 days.

(21) Appl. No.: 13/788,498

(22) Filed: Mar. 7, 2013

(65) Prior Publication Data

US 2014/0258999 A1    Sep. 11, 2014

(51) Int. Cl.
G06F 9/44    (2006.01)
G06F 9/445    (2006.01)

(52) U.S. Cl.
CPC . *G06F 8/65* (2013.01); *G06F 8/60* (2013.01); *G06F 8/61* (2013.01); *G06F 8/67* (2013.01); *G06F 8/70* (2013.01)

(58) Field of Classification Search
CPC .............................................. G06F 8/60–8/68
See application file for complete search history.

(56) References Cited

U.S. PATENT DOCUMENTS

| | | | |
|---|---|---|---|
| 8,689,048 B1* | 4/2014 | Novick et al. | 714/15 |
| 2002/0138321 A1* | 9/2002 | Yuan et al. | 705/8 |
| 2004/0172445 A1* | 9/2004 | Singh et al. | 709/200 |
| 2004/0243971 A1* | 12/2004 | Leung | 717/104 |
| 2007/0244999 A1* | 10/2007 | Hamanaka et al. | 709/220 |
| 2008/0082978 A1* | 4/2008 | Or et al. | 718/100 |
| 2009/0265699 A1* | 10/2009 | Toeroe | 717/168 |
| 2010/0333094 A1* | 12/2010 | Restall et al. | 718/102 |
| 2011/0124406 A1* | 5/2011 | Blackburn et al. | 463/25 |
| 2013/0036328 A1* | 2/2013 | Mutisya et al. | 714/15 |

OTHER PUBLICATIONS

Katihar, Ekansh S., "Operating System Upgrade under High Availability Constraints", Concordia University, Nov. 27, 2012, 27 pages.
Service Availability Forum Application Interface Specification, Software Management Framework, SAI-AIS-SMF-A.01.02, The Perl Foundation, http://www.saforum.org/, reissued Sep. 30, 2011, 174 pages.

* cited by examiner

*Primary Examiner* — Lewis A Bullock, Jr.
*Assistant Examiner* — Tina Huynh
(74) *Attorney, Agent, or Firm* — Nicholson, De Vos, Webster & Elliot, LLP

(57) ABSTRACT

An embedded step is executed to upgrade multiple layers of a system. The embedded step includes multiple nested steps, and each nested step includes a sequence of actions for upgrading one of the layers. A finite state machine defines the state transitions for each nested step. During the execution of the nested steps, an outer step of the nested steps is transitioned from an executing state into a waiting state after the outer step completes a tear-down. During the transitioning of the outer step, the outer step sends a trigger to an inner step of the nested steps to cause the inner step to transition into the executing state. When the inner step is completed, the outer step is transitioned out of the waiting state to execute a build-up phase. Execution of the embedded step is completed when an outermost step of the nested steps is completed.

18 Claims, 7 Drawing Sheets

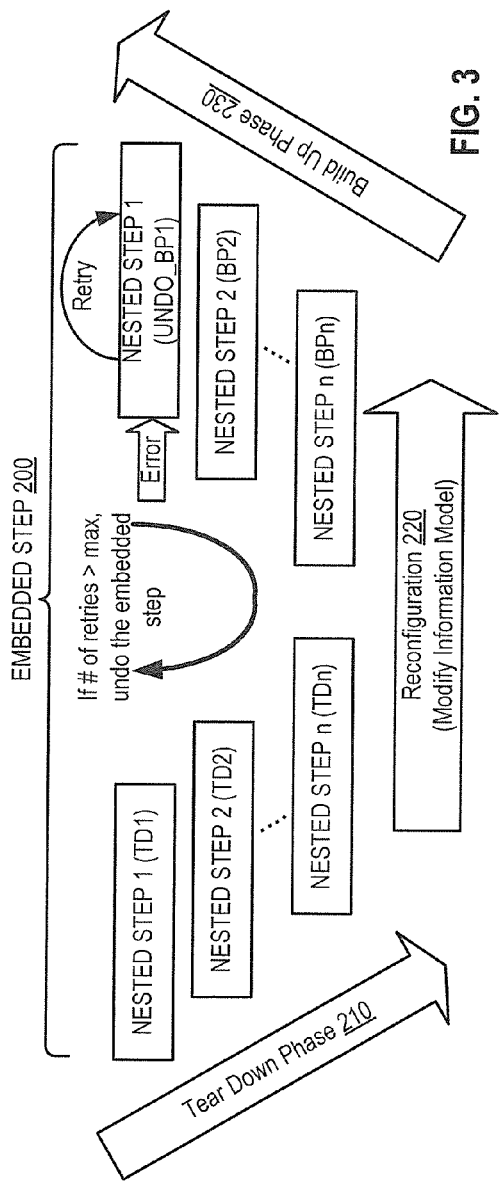
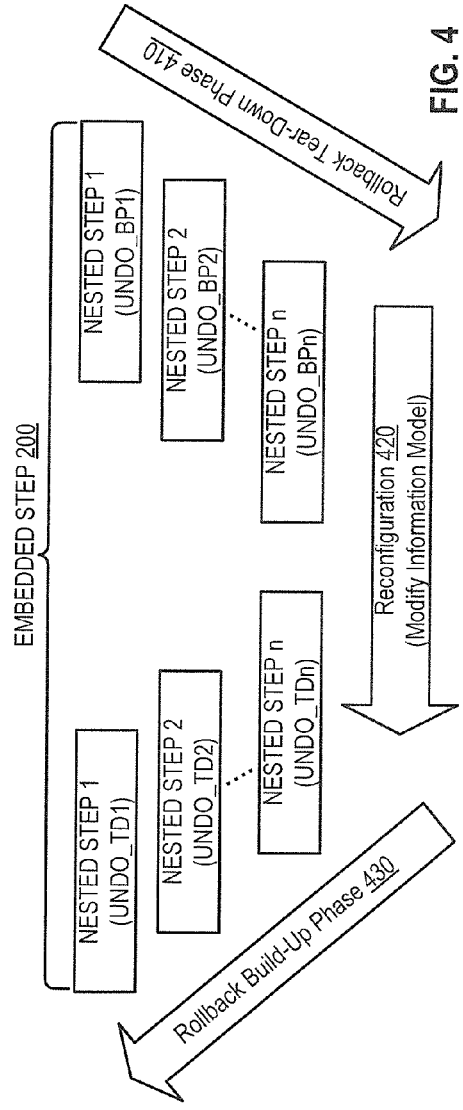
FIG. 3
FIG. 4

| Step 1 (Outer Nested Step) State | Phase 0: tear-down 1: build-up | Step 2 (Inner Nested Step) State | Phase 0: tear-down 1: build-up |
|---|---|---|---|
| Initial |  | Initial |  |
| Executing | 0 | Initial |  |
| Waiting | 0 | Executing | 0 |
| Waiting | 0 | Executing | 1 |
| Waiting | 0 | Completed | 1 |
| Executing | 1 | Completed | 1 |
| Completed | 1 | Completed | 1 |

FIG. 7A (FORWARD)

| Step 1 (Outer Nested Step) State | Phase 0: tear-down 1: build-up | Step 2 (Inner Nested Step) State | Phase 0: tear-down 1: build-up |
|---|---|---|---|
| Executing | 1 | Completed | 1 |
| Undoing | 1 | Completed | 1 |
| Partial Undone | 0 | Completed | 1 |
| Partial Undone | 0 | Partial Undoing | 1 |
| Partial Undoing | 0 | Undone | 0 |
| Undone | 0 | Undone | 0 |

FIG. 7B (UNDO)

| Step 1 (Outer Nested Step) State | Phase 0: tear-down 1: build-up | Step 2 (Inner Nested Step) State | Phase 0: tear-down 1: build-up |
|---|---|---|---|
| Completed | 1 | Completed | 1 |
| Rolling Back | 0 | Completed | 1 |
| Rollback Waiting | 0 | Rolling Back | 0 |
| Rollback Waiting | 0 | Rolling Back | 1 |
| Rolling Back | 1 | Rolled Back | 1 |
| Rolled Back | 1 | Rolled Back | 1 |

FIG. 7C (ROLLBACK)

SYSTEM UPGRADE UNDER HIGH AVAILABILITY CONSTRAINTS

TECHNICAL FIELD

Embodiments of the invention relate to software management; and more specifically, to management of software reconfiguration.

BACKGROUND

The Service Availability Forum (SA Forum or SAF) is a consortium of industry-leading companies promoting a set of open specifications that enables the creation and deployment of highly available and mission critical services. As a standardization body, the SA Forum has defined a set of open specifications, including the Software Management Framework (SMF), for middleware services. The SMF is defined to support the upgrade of software and hardware entities in a SA Forum compliant system.

An SA Forum compliant system can be characterized by its deployment configuration. The deployment configuration may need to be changed at any time, for example, to tune its performance by creating new instances of an entity type, by modifying parts of the configuration, or by removing some of the existing instances. In some cases, it is necessary to downgrade entities to an earlier version of their base entity type.

The SMF orchestrates the migration of a live system from one deployment configuration to another while ensuring service availability. In SMF terms, this migration process is called an upgrade campaign. The SMF defines an XML schema to specify an upgrade campaign. The upgrade campaign is a script of actions and configuration changes that lead to the target configuration.

The SMF describes various upgrade methods; however, these methods cannot handle dependencies between the software entities without outage, e.g., if un-installation of the old software require the old operating system, while installation of the new software requires the new operating system. Further, the existing upgrade methods cannot be used "as-is" for all kinds of different system topologies without causing a negative impact on service availability.

SUMMARY

Embodiments of the invention provide a system and method for executing an embedded step to upgrade multiple layers of a system. The embedded step includes multiple nested steps, and each of the nested steps includes a sequence of actions for upgrading one of the layers.

In one embodiment, a method for executing an embedded step comprises the step of performing state transitions according to a finite state machine for each of the nested steps. During the execution of the nested steps, an outer step of the nested steps is transitioned from an executing state into a waiting state of the FSM after the outer step completes a tear-down phase of the sequence of actions. During the transitioning of the outer step, the outer step sends a trigger to an inner step of the nested steps to cause the inner step to transition into the executing state. When the inner step is completed, the outer step is transitioned out of the waiting state to execute a build-up phase of the sequence of actions. The method further comprises the step of completing the execution of the embedded step when an outermost step of the nested steps is completed.

In another embodiment, a computer system is adapted to execute an embedded step to upgrade multiple layers of a system. The computer system comprises one or more processors, one or more memory devices coupled to the one or more processors, and an upgrade engine module coupled to the one or more processors and the one or more memory devices. The upgrade engine module is adapted to perform the method described above.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 3 is a diagram illustrating a process for undo execution according to one embodiment of the invention.

FIG. 4 is a diagram illustrating a process for rollback execution according to one embodiment of the invention.

FIGS. 7A, 7B and 7C are examples of state transitions for forward, undo and rollback execution according to one embodiment of the invention.

DESCRIPTION OF EMBODIMENTS

Figure 1:
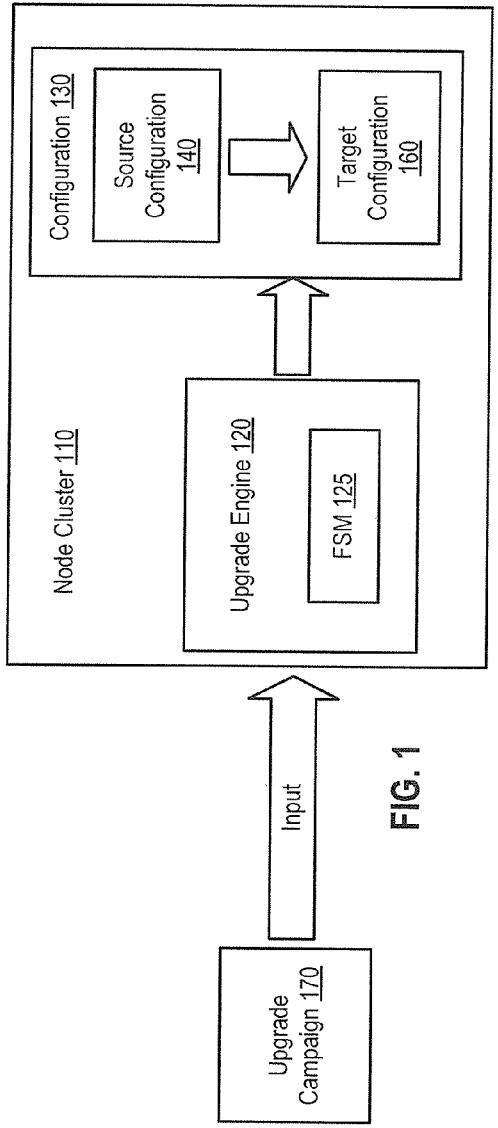
FIG. 1 is a diagram illustrating an upgrade engine for performing system upgrade according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide an upgrade engine for upgrading lower-layer entities of one or more nodes in a cluster with high service availability as a requirement. The upgrade engine executes upgrade actions in one or more embedded steps, with each embedded step including a sequence of nested steps. The upgrade engine executes the sequence of nested steps according a finite state machine (FSM), which specifies states, transitions and events to enforce the order of execution such that impact to service availability can be minimized. As used herein, the term "upgrade" refers to any types of actions (including downgrade) that change the configuration of a system or the entities in a system, and is equivalent to "reconfigure" or "reconfiguration."

To better understand the upgrade actions described herein, it is helpful to first explain some basic concepts and vocabulary to be used in the following description. An "online" installation or un-installation refers to software which can be installed or uninstalled without disturbing or impacting the ongoing operation of any of the entities in the system, including those entities being upgraded. Hence these online operations can be performed in advance of initiating the upgrade procedure in case of the installation, or after the upgrade procedure in the case of un-installation. On the other hand, "offline" installation or un-installation refers to operations which may impact the behavior of some entities and therefore, in order to maintain control of the system from the perspective of availability management, these impacted entities need to be taken offline, i.e., out-of-service, prior to initiating the upgrade procedure. The collection of these impacted entities that are taken offline for the upgrade step are referred to as the "deactivation unit." At the end of the upgrade step, some or all of the deactivated entities and the newly added entities need to be activated or reactivated. The collection of entities that are put back into service is called the upgrade step's "activation unit." When the activation unit is the same as the deactivation unit, such activation/deactivation unit is referred to as a "symmetric activation unit."

According to the SMF, during the execution of an upgrade step, the deactivation unit (or the symmetric activation unit) is terminated and the activation unit (or symmetric activation unit) is instantiated. Alternatively the symmetric activation unit can be restarted instead of being terminated then instantiated. If an upgrade is made to entities belonging to multiple layers of a software stack (e.g., application software and operating system (OS)), the SMF may need to deactivate the entities of multiple layers at the same time, thus impacting a large scope of the system. In a conventional system, large-scope deactivation leads to at least two concerns. First, the upper layer of the software system (e.g., the application software) may need a running instance of a lower layer (e.g., the OS) for its operation which have been terminated as a part of the deactivation. Hence, un-installation of the upper layer cannot be carried out. Second, apart from the SAF-managed software, there may be some other software (e.g., a database, which is not managed by the SAF) running on top of the lower layer (e.g., the OS). Large-scope deactivation leads to the termination of non-SAF-managed software, as the lower layer has been terminated.

To cope with the above mentioned concerns an embedded step can be created to include any number of upgrade steps nested within each other therefore termed as nested steps. These nested steps target different layers of a software stack separately, leading to the removal of old software layer by layer sequentially, starting from the top-most layer of the software stack, and installation of new software layer by layer sequentially, starting from the bottom-most layer of the software stack. As a result, the lower layer can run uninterruptedly when the upper layer requires its services. When the upper layer undergoes un-installation or installation, a non-SAF-managed system can still provide services.

The term "lower layer" herein refers to all of the layers including and below the middleware defined in the SA Forum. One example of a lower-layer entity is an operating system (OS). It is appreciated that the upgrade engine described herein is also applicable to other lower-layer entities, including hardware layers. Using the OS as an example, the OS considered herein may be running directly on hardware, or may be running inside a virtual machine. When applying to the upgrade of an OS, the upgrade engine can perform version change of an OS (e.g., from Ubuntu 9.04 to Ubuntu 10.04), base type change of an OS (e.g., from Ubuntu to Fedora), clean installation of an OS (which is equivalent to bringing a new physical or virtual machine into a cluster of nodes), and removal of an OS (which is equivalent to removing a physical or virtual machine from the cluster).

Further, the term "OS incompatibility" refers to the incompatibility that arises when the old lower layer cannot support the new upper layer. This means that no installation can happen on the old lower layer; e.g., an old OS can support a component with an older version but cannot support the same component with a new version. The term "application incompatibility" refers to the incompatibility that arises when the old upper layer cannot be run on the new lower layer. This means that the old component or old upper layer has become obsolete and should be uninstalled; e.g., a new OS can support a component with a new version but cannot support the same component with an older version.

The upgrade steps and actions described herein can be applied to a wide range of machines, such as diskless machines, nodes sharing a single image, nodes having dedicated images, and disk-contained machines. The term "machine" herein refers to a physical machine, and the term "node" herein refers to a cluster node that runs directly on a physical machine or in a virtual machine. For diskless machines, the nodes are booted through a network using an image available on a remote machine. In this case the new OS image is brought to the remote machine and the nodes of the cluster are restarted one by one with the updated path to the new OS image. For nodes sharing a single image, all of the nodes in a cluster boot from a single OS image present in the network. For nodes having dedicated images, each node of the cluster has a separate dedicated boot image present in the network. For disk-contained machines, each node may boot from an OS installed on the machine itself.

FIG. 1 illustrates an upgrade engine 120 that executes upgrade actions according to one embodiment of the invention. The upgrade engine 120 receives an upgrade campaign 170 as input, which specifies a sequence of upgrade steps to be performed in a system of one or more nodes in a node cluster 110. One or more of the upgrade steps are embedded steps, each of which embeds a sequence of nested steps. Each of the embedded steps (and the nested steps embedded therein) is applied on a set of entities (e.g., the entities defined in the Availability Management Framework (AMF)). Together these steps are carried out to migrate the system from a source configuration 140 to a target configuration 160. All of the nested steps can undergo forward execution, undo execution (if the forward execution fails), and rollback (if the undo execution attempts exceed the limit specified in the upgrade campaign or if requested by the system administrator).

Each of the nested steps is a basic step. There are four types of basic steps: in-phase normal steps, out-of-phase normal steps, reduced upgrade steps and locked reduced upgrade steps. Each basic step includes a sequence of upgrade actions that can be grouped into three phases: (1)

Tear-down phase: during this phase, components defined for the corresponding scope are terminated in the system. Online and offline un-installation of related software take place in this phase. (2) Reconfiguration phase: during this phase, the Information Model is modified so that obsolete components are removed and new and reconfigured components can be used after the upgrade. (3) Build-up phase: during this phase, components defined for the corresponding scope are started or restarted in the system. Online and offline installation of related software take place in this phase.

A first type of the basic step is an in-phase normal step. An in-phase normal step is capable of carrying out the upgrade of any kind of software and hardware system and also capable of upgrading the software and the hardware. An in-phase normal step executes all of the installation and un-installation operations in an offline mode. As used herein, the "offline mode" refers to the execution of operations after the lock and termination of the deactivation unit, where these operations may be specified in the software package/bundle as online installation/un-installation. This step can be used when there is OS and application incompatibility and the component being upgraded is not restartable without service impact. An in-phase normal step is executed in the order of the tear-down phase, the reconfiguration phase, and the build-up phase.

The in-phase normal step includes the following sequence of actions for the forward execution. Among the actions, N1-N4 form the tear-down phase, N5 forms the reconfiguration phase, and N6-N9 form the build-up phase.

TABLE 1

N1. Lock deactivation unit
N2. Terminate deactivation unit
N3. Offline uninstallation of old software
N4. Online uninstallation of old software
N5. Modify information model
N6. Online installation of new software
N7. Offline installation of new software
N8. Instantiate activation unit
N9. Unlock activation unit To undo an in-phase normal step is to undo each of the actions N1-N9. The following U1-U9 actions undo the forward execution of an in-phase normal step. Each of U1-U9 undoes the corresponding action N1-N9 (e.g., U1 undoes N1, U2 undoes N2, etc.)

TABLE 2

U1. Unlock deactivation unit
U2. Instantiate deactivation unit
U3. Offline installation of old software
U4. Online installation of old software
U5. Revert changes of the information model
U6. Online uninstallation of new software
U7. Offline uninstallation of new software
U8. Terminate activation unit
U9. Lock activation unit Reversing the above sequence of undo actions rolls back the forward execution of an in-phase normal step. That is, rollback actions include the sequence of actions executed in the order of U9-U1.

A second type of the basic step is an out-of-phase normal step. An out-of-phase normal step is one of the standard steps defined in the SMF specification and is also referred to as a normal upgrade step. This step can be used when there is no OS and application incompatibility and the component being upgraded is not restartable without service impact. An out-of phase normal step includes the following sequence of actions for the forward execution: {N6, N1, N2, N3, N5, N7, N8, N9, N4}, the following sequence of actions for the undo operation: {U6, U1, U2, U3, U5, U7, U8, U9, U4}, and the following sequence of action for the rollback operation: {U4, U9, U8, U7, U5, U3, U2, U1, U6}. This step is called "out-of-phase" because the tear-down phase and the build-up phase are interleaved.

In an out-of-phase normal step, the online installation action is executed before any other action is executed. However, this execution ordering leads to application incompatibility or OS incompatibility issues. For example, to install a component, a compatible OS must be present on the machine.

A third type of the basic step is a locked reduced upgrade step. A locked reduced upgrade step can be used when all of the entities that need to be upgraded can undergo online installation and those entities are restartable, but not without service impact. The actions R2 and R5 below assure that the AMF will switch the assignment of the services to its standby units before allowing the system to undergo a restart.

TABLE 3

R1. Online installation of new software (same as N6)
R2. Lock symmetric activation unit
R3. Modify information model (same as N5)
R4. Restart symmetric activation unit
R5. Unlock symmetric activation unit
R6. Online uninstallation of old software (same as N4).

The undo operation for the locked reduced upgrade step has two different sequences of actions. One is pre-restart undo and the other is post-restart undo. The pre-restart undo is a set of actions which are taken when the error occurs before the restart of the symmetric activation unit. The post-restart undo is a set of actions which are taken when the error occurs at or after the restart of symmetric activation unit. The sequence of actions for the rollback operation is: {PO6, PO5, PO4, PO3, PO2, PO1}.

TABLE 4

| Pre-restart Undo | Post-restart Undo |
| --- | --- |
| PR1. Online uninstallation of new software | PO1. Online uninstallation of new software |
| PR2. Unlock symmetric activation unit | PO2. Unlock symmetric activation unit |
|  | PO3. Restart symmetric activation unit |
| PR3. Reverse information model modifications | PO4. Reverse information model modifications |
|  | PO5. Lock symmetric activation unit |
|  | PO6. Online installation of old software |

A fourth type of the basic step is a reduced upgrade step, which is another standard step defined in the SMF specification. This step can be used when all the entities that need to be upgraded can undergo online installation and the corresponding scope—that is, the entities explicitly or implicitly included in the symmetric activation unit—is restartable without any service impact. The sequence of actions for the forward execution is {R1, R3, R4, R6}. The sequence of actions for the pre-restart undo is: {PR1, PR3}, and for the post-restart undo is: {PO1, PO3, PO4, PO6}. The sequence of actions for the rollback operation is: {PO6, PO4, PO3, PO1}. One problem with this step is that the node providing services will be restarted without shifting the assignment to its standby; therefore it is applicable only if it causes no service outage.

An embedded step includes multiple basic steps that are embedded inside each other to form a sequence of nested steps. The embedding of the nested steps follows the following rules: (1) Any (i.e., in-phase or out-of-phase) normal step can embed any normal step provided that any out-of-phase normal step is satisfied by its nested in-phase normal steps (if there is any) in terms of OS and application compatibility. (2) Any normal steps can embed any (i.e. locked or not) reduced steps. (3) Reduced steps cannot embed any kind of steps.

The execution of the nested steps is sequentially ordered, such that first the tear-down phase is executed for each nested step sequentially, starting from the outermost nested step. Execution of the tear-down phase is followed by a reconfiguration phase of each nested step. Finally, the build-up phase of each nested step is executed sequentially, starting with the innermost nested step. The execution of the tear-down phase, the reconfiguration phase and the build-up phase is described in further detail with reference to FIGS. 2-4.

Figure 2:
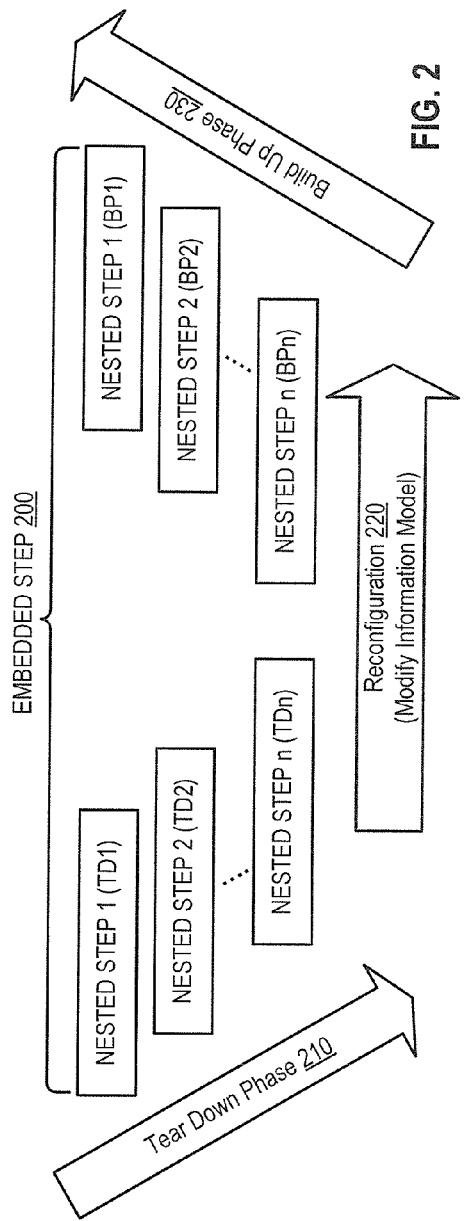
FIG. 2 is a diagram illustrating a process for forward execution of an embedded step according to one embodiment of the invention.

FIG. 2 illustrates a process for the forward execution of an embedded step 200 according to an embodiment. The embedded step 200 includes a sequence of nested steps from 1 to n. Each nested step includes a tear-down phase (TD) 210, a reconfiguration phase 220 and a build-up phase (BP) 230. The embedded step 200 is executed in the order of the tear-down phase 210 (from TD1 to TDn), the reconfiguration phase 220, and then the build-up phase 230 (from BPn to BP1). Referring to Table 1, if nested step 1 is an in-phase normal step, TD1 includes N1-N4, the reconfiguration includes N5, and BP1 includes N6-N9. If nested step 1 is an out-of-phase normal step, TD1 includes N6, N1-N3, the reconfiguration includes N5, and BP1 includes N7-N9, N6. The online operations N4 and N6 of an out-of-phase normal step do not determine the phase of execution.

Assume that an embedded step includes a first nested step and a second nested step, both of which are in-phase normal steps. The first nested step includes TD1 and BP1 as the tear-down phase and the build-up phase, respectively; the second nested step includes TD2 and BP2 as the tear-down phase and the build-up phase, respectively. The forward execution of the two nested steps is executed in the order of: TD1 (N1-N4), TD2 (N1-N4), reconfiguration (N5 of nested step 1, N5 of nest step 2), BP2 (N6-N9) and BP1 (N6-N9). In the reconfiguration phase, the N5 action of nested step 1 and nested steps 2 can be executed in any order, or may be interleaved in some embodiments. This order of execution can be extended to any number of nested steps as shown in FIG. 2.

FIG. 3 illustrates a process for undoing the execution of the embedded step 200 according to an embodiment. In the example of FIG. 3, it is assumed that an error occurs during the execution of the build-up phase of nested step 1 (which is BP1 in FIG. 2). To remove the error, undo_BP1 is performed to undo each of the actions in BP1. Referring to Table 2, if nested step 1 is an in-phase normal step, undo TD1 includes U4-U1, the reconfiguration includes U5, and undo_BP1 includes U9-U6. In response to the error, undo_BP1 is re-tried a number of times until the actions of BP 1 are successfully undone and the forward execution is completed, or until the number of retries exceeds a predefined maximum number. It is noted that only the phase of the nested step in which the error occurs is retried. If the retries of BP1 exceed the predefined maximum number, the entire embedded step 200 is undone.

FIG. 4 illustrates a rollback process for the embedded step 200 according to an embodiment. During the rollback, entities that were installed during the forward execution are uninstalled, and entities that were removed during the forward execution are re-installed. The rollback includes a rollback tear-down phase 410, a reconfiguration phase 420 and a rollback build-up phase 430. The rollback tear-down phase 410 reverses the actions of the build-up phase 230 of the forward execution (FIG. 2), and the rollback build-up phase 430 reverses the actions of the tear-down phase 210 of the forward execution.

Figure 5:
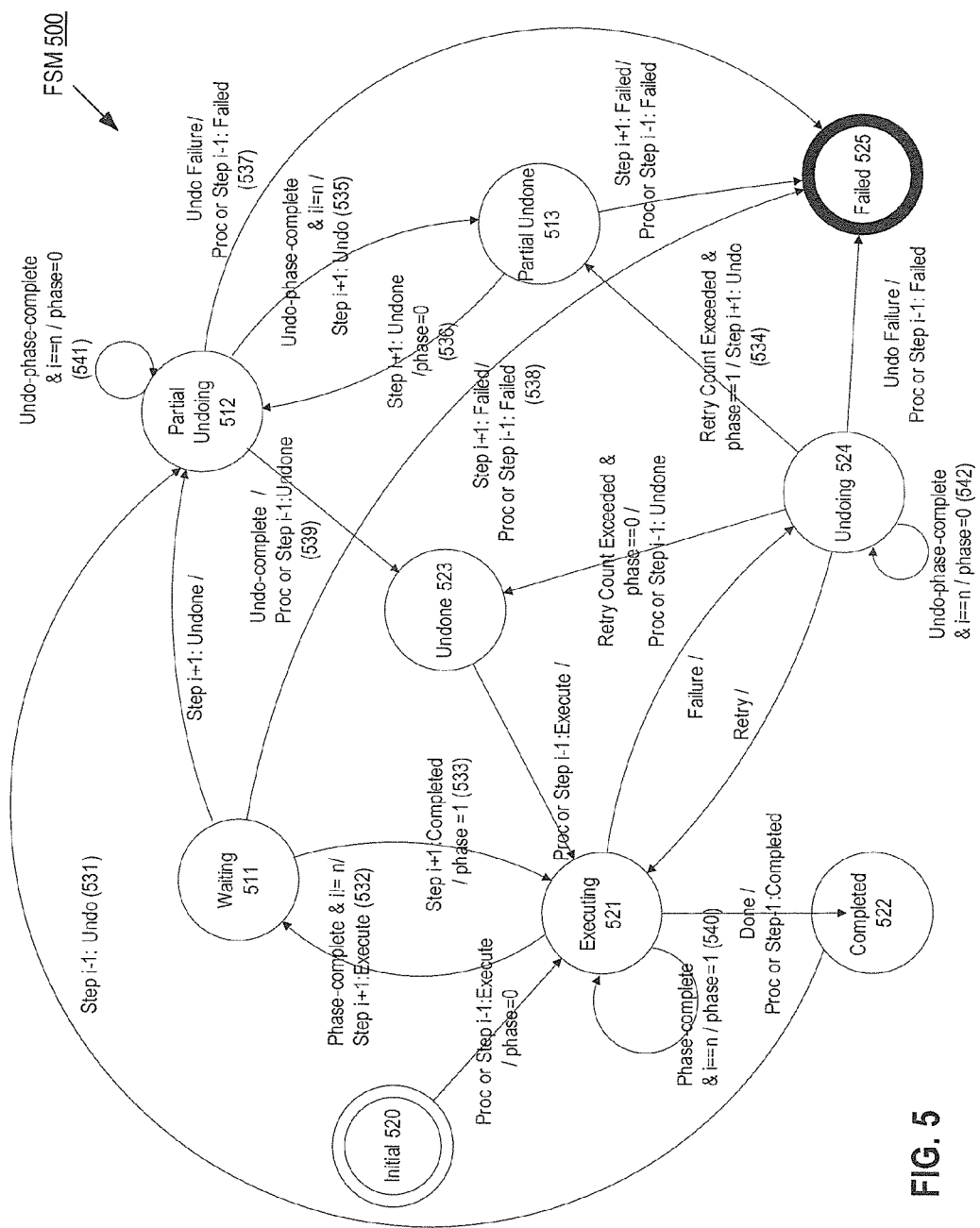
FIG. 5 is a diagram of a finite state machine for forward and undo execution according to one embodiment of the invention.

FIG. 5 illustrates a finite state machine (FSM) 500 for executing and undoing a nested step of an embedded step, according to one embodiment of the invention. The circles in the FSM 500 represent states, and the lines between the circles represent transitions and events. Each nested step (Step i) except the innermost step communicates with its immediate inner nested step (Step i+1), and each nested step (Step i) except the outermost step communicates with its immediate outer nested step (Step i−1). Outermost step receives the instruction from its associated procedure, and also communicates the result of the execution of the embedded step as a whole back to the procedure. The nested step that is first to start is the last to finish. Each nested step executes a separate FSM instance and inter-communicates with other nested steps.

To handle the execution of nested steps, the standard upgrade step FSM has been extended for both the normal execution and the undo execution to include new states, transitions and events as shown in FIG. 5. In addition to an initial state 520, an executing state 521, a completed state 522, an undone state 523, an undoing state 524, and a failed state 525, the FSM 500 includes the following new states: a waiting state 511, a partial undoing state 512 and a partial undone state 513. A nested step enters into the waiting state 511 after it has completed the tear-down phase (e.g., removing the old software); at this point its immediate inner nested step can begin its execution. The partial undoing state 512 is similar to the undoing state except that the partial undoing state 512 does not allow the nested step to move into the execution state 521 for a retry. A nested step moves to the partial undone state 513 once it has undone the build-up phase (e.g., uninstalling the new software). The nested step waits in the partial undone state 513 until the nested steps embedded in it have successfully undone themselves.

The FSM 500 includes the following new transitions:

From the completed state 522 to the partial undoing state 512 is a transition 531. The transition 531 occurs when an outer nested step has partially undone itself and hence it requests its already completed inner nested step to undo itself.

From the executing state 521 to the waiting state 511 is a transition 532. The transition 532 occurs when a nested step, which is not the innermost nested step, has completed its tear-down phase and hence it requests its inner nested step to begin its execution.

From the waiting state 511 to the executing state 521 is a transition 533. The transition 533 occurs for a given nested step when all of its inner nested steps have completed their execution and therefore the given nested step can resume its execution with the build-up phase.

From the undoing state 524 to the partial undone state 513 is a transition 534. The transition 534 occurs when a given nested step has successfully undone its build-up phase after retrying a maximum number of times in response to a failure, and hence the given nested step requests its inner step to begin undoing its execution.

From the partial undoing state 512 to the partial undone state 513 is a transition 535. The transition 535 occurs when a given nested step, which is not the innermost nested step, has successfully undone its build-up phase and hence it requests its inner nested step also to start undoing itself.

From the partial undoing state 512 to the undone state 523 is a transition 539. The transition 539 occurs when a given nested step, has successfully undone its tear-down phase and completed its undoing. Hence, it requests its outer nested step also to complete undoing itself, or reports to the procedure of that the embedded step has been undone.

Reflective transitions 540 and 541 of state 521 and 512 are executed by the innermost nested step when it completes its tear-down phase of the forward execution, and when it has undone its build-up phase, respectively. Reflective transition 542 of state 524 is executed by the innermost nested step when it has undone the build-up phase.

From the partial undone state 513 to the partial undoing state 512 is a transition 536. This transition 536 occurs when a nested step, which has been waiting in the partial undone state 512, can resume undoing itself since its nested step is now undone.

From the partial undoing state 512 to the failed state 525 is a transition 537. The transition 537 occurs when a nested step encounters a second failure while undoing itself. From the waiting state 511 to the failed state 525 is a transition 538. The transition 538 occurs when an outer nested step, while waiting for its inner nested step to complete, receives a failed signal from that inner nested step.

Figure 6:
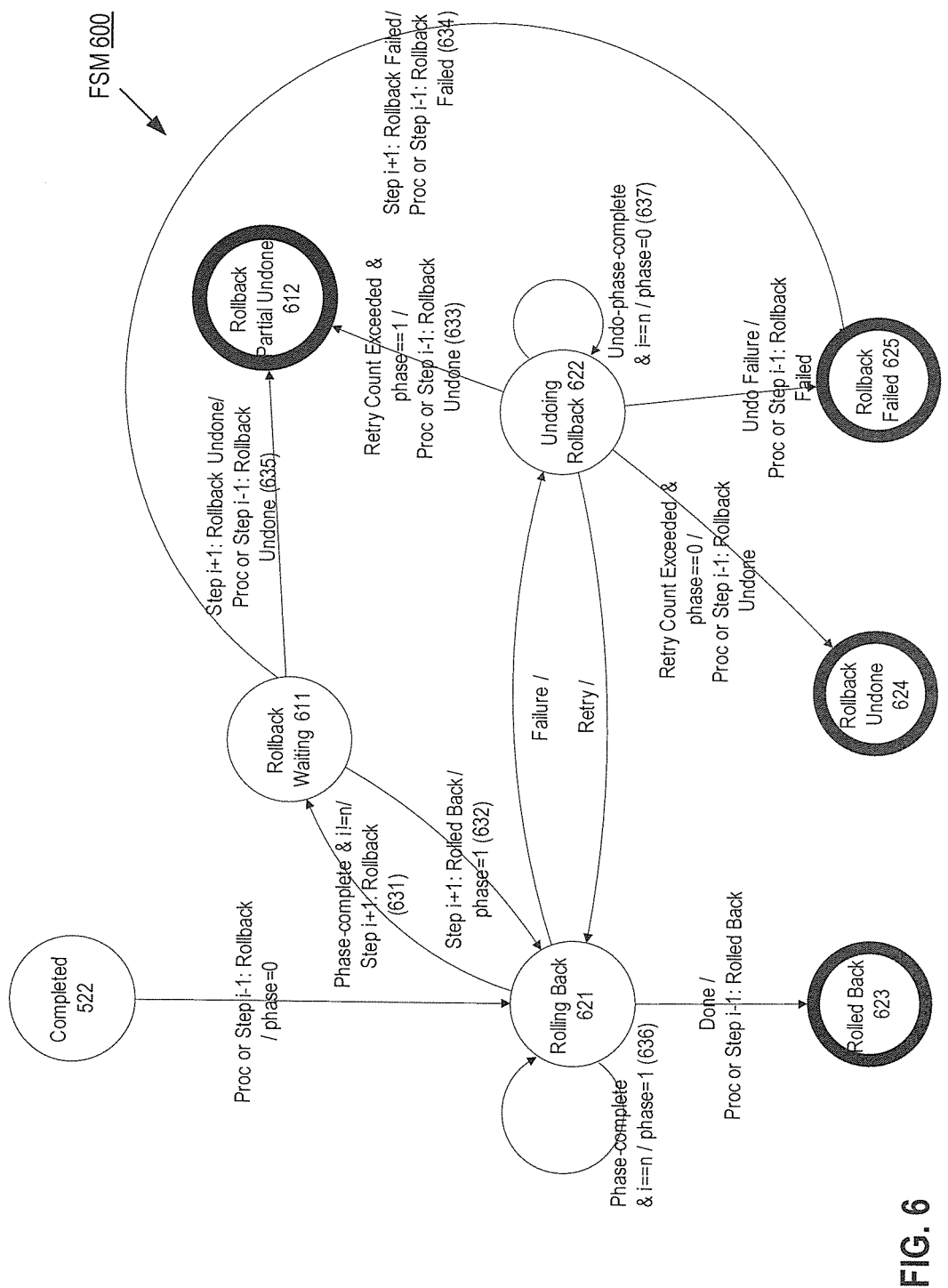
FIG. 6 is a diagram of a finite state machine for rollback execution according to one embodiment of the invention.

FIG. 6 illustrates a finite state machine (FSM) 600 for rolling back the execution of a nested step of an embedded step, according to one embodiment of the invention. The FSM 500 and the FSM 600 can be joined by the completed state 522 to form a single FSM. To handle the rollback of nested steps, the standard upgrade step FSM has been extended for the rollback execution to include new states, transitions and events as shown in FIG. 6. In addition to a rolling back state 621, an undoing rollback state 622, a rolled back state 623, a rollback undone state 624, and a rollback failed state 625, the FSM 600 includes the following new states: a rollback waiting state 611 and a rollback partial undone state 612. A nested step enters into the rollback waiting state 611 after it has completed its tear-down phase (e.g., un-installing the new software); at this point, its immediate nested step can begin its rollback. A nested step moves to the rollback partial undone state 612 once it has undone its build-up phase (e.g., re-installing the old software) and it has exceeded the maximum permitted retries, or if the nested step is in the rollback waiting state 611 and it receives the rollback undone signal from its inner nested step.

The FSM 600 includes the following new transitions:

From the rolling back state 621 to the rollback waiting state 611 is a transition 631. The transition 631 occurs when a nested step, which is not the innermost step, has completed its tear-down phase of the rollback and moves to waiting while its inner nested step rolls back itself.

From the rollback waiting state 611 to the rolling back state 621 is a transition 632. The transition 632 occurs for an outer nested step when it can resume its rollback since its inner nested step has rolled back successfully.

From the undoing rollback state 622 to the rollback partial undone state 612 is a transition 633. The transition 633 occurs when a nested step has completed undoing its build-up phase after a failure but has exceeded the maximum retries permitted.

From the rollback waiting state 611 to the rollback failed state 625 is a transition 634. The transition 634 occurs when an outer nested step, while waiting for its inner nested step to rollback, receives a rollback failed signal from that inner nested step.

From the rollback waiting state 611 to the rollback partial undone state 612 is a transition 635. The transition 635 occurs when a nested step, while waiting for its inner nested step to rollback, receives the rollback undone signal from that inner nested step.

Reflective transitions 636 and 637 of state 621 and 622 are executed by the innermost nested step when it completes its tear-down phase of the rollback execution and when it has undone its build-up phase, respectively.

Referring to FIG. 5 and FIG. 6, the FSM 500 and the FSM 600 use events or signals to trigger state transitions and/or to indicate completion of actions. For example, a completed nested step receives an undo event/signal when its outer nested step has partially undone itself. A phase-complete event/signal is generated when a nested step has successfully completed its tear-down phase. An undo-phase-complete event/signal is generated when a nested step has successfully completed undoing of its build-up phase. An undo-complete event/signal is generated when a nested step is in the partial undoing state 512 and it has completed its undo, i.e., it has undone its tear-down phase.

FIGS. 7A, 7B and 7C provide examples of state transitions for the forward execution, undo execution and rollback, respectively. Each example illustrates the execution of two nested steps: step 1 (the outer nested step) and step 2 (the inner nested step) during the tear-down phase (phase 0) and the build-up phase (phase 1). Although the reconfiguration phase is not shown, it is understood that the reconfiguration actions can be performed during the reflective transition between phase 0 and phase 1.

Referring to FIG. 5 and FIG. 7A, when step 1 finishes executing phase 0, it transitions from the executing state 521 (of FIG. 5) to the waiting state 511. At this point, step 2 receives a trigger (e.g., an event, a message, a signal, or an instruction) from step 1 and starts executing phase 0 and then phase 1. After step 2 is completed, step 1 transitions out of the waiting state 511 into the executing state 521 to execute phase 1. When step 1 finishes the execution of phase 1, the forward execution is completed for both nested steps.

In the example of FIG. 7B, it is assumed that an error occurs when step 1 is in the executing state 521 of phase 1. Step 1 transitions to the undoing state 524 and retries a number of times. If the retries are unsuccessful and the number of retries exceeds a maximum number, step 1 undoes its phase 1 and transitions to the partial undone state 513. At this point, step 2 receives a trigger from step 1 and transitions out of the completed state 522 into the partial undoing state 512, during which step 2 undoes its phase 1. Step 2 continues to undo its phase 0 and then transitions into the undone state 523. At this point, step 1 receives a trigger from step 2 and transitions out the partial undone state 513 into the partial undoing state 512, undoes its phase 0, and transitions into the undone state 523. When step 1 finishes the undo execution of phase 0, the undo execution is completed for both nested steps. Thus the embedded step is undone.

In the example of FIG. 7C, a rollback process starts when both step 1 and step 2 are in the completed state 522. Phase 0 in this example is the rollback tear-down phase, which is to tear down the build-up actions performed in the forward execution. Phase 1 in this example is the rollback build-up phase, which is to build up the tear-down actions performed in the forward execution. Step 1 begins with transitioning from the completed state 522 into the rolling back state 621, during which step 1 executes the rollback actions in phase 0. After step 1 finishes rolling back phase 0, it transitions to the rollback waiting state 611. At this point, step 2 receives a trigger from step 1 and transitions out of the completed state 522 into the rolling back state 621, during which step 2 executes the rollback actions in phase 0 and then phase 1. After step 2 finishes rolling back phase 1, it transitions to the rolled back state 623. At this point, step 1 receives a trigger from step 2 and transitions out of the rollback waiting state 611 into the rolling back state 621 to execute the rollback actions in phase 1. When step 1 finishes the rollback of phase 1, the rollback is completed for both nested steps.

If a failure occurs during the rollback, step 1 and step 2 may end the rollback in two different states. For example, if an error occurs when step 1 is rolling back phase 1 after step 2 has completely rolled back, step 1 will transition from the rolling back state 621 to the undoing rollback state 622 and retries the rollback a number of times. If the retries are unsuccessful and the number of retries exceeds a maximum number, step 1 undoes the rollback in phase 1 and transitions to the rollback partial undone state 612. Step 1 stays in that state while step 2 is in the rolled back state 623.

Figure 8:
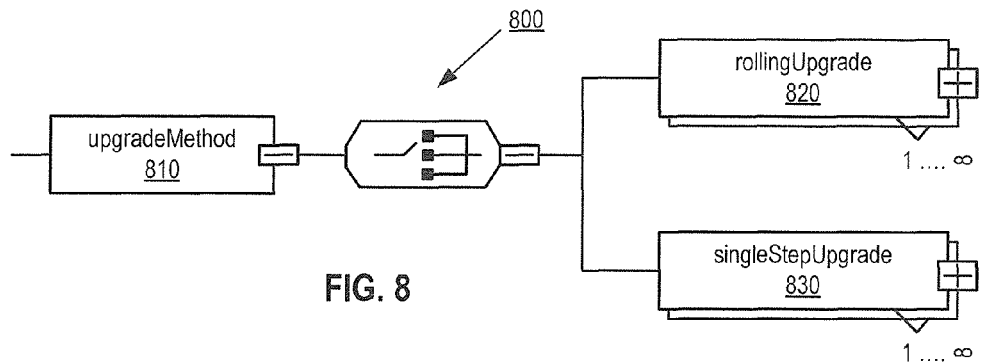
FIG. 8 is a diagram of a schema defining embedded steps according to one embodiment of the invention.

FIG. 8 illustrates a portion of an Extensible Markup Language (XML) schema 800 that is defined according to one embodiment. The schema 800 is an extension of the standard schema defined in the upgrade campaign specification according to the SMF. The embedded step described above is defined according to the schema 800 that specifies the embedded step to include one or more nested steps. The schema 800 defines an upgrade method 810, which is used by the procedure and the entities to which it applies. Under the upgrade method 810 is the choice of rolling upgrade 820 or single step upgrade 830. The rolling upgrade 820 defines a template of an upgrade step, which acts on a deactivation-activation unit-pair. At execution the template is applied to the configuration of the system to be upgraded and entities matching the template are upgraded in a rolling manner. The single step upgrade 830 defines only one upgrade step which acts on a single pair of deactivation-activation units. Each of the rolling upgrade 820 and the single step upgrade 830 has multiplicity of 1 to infinity, as each upgrade step defined therein is an embedded step that can include a sequence of nested steps.

Figure 9:
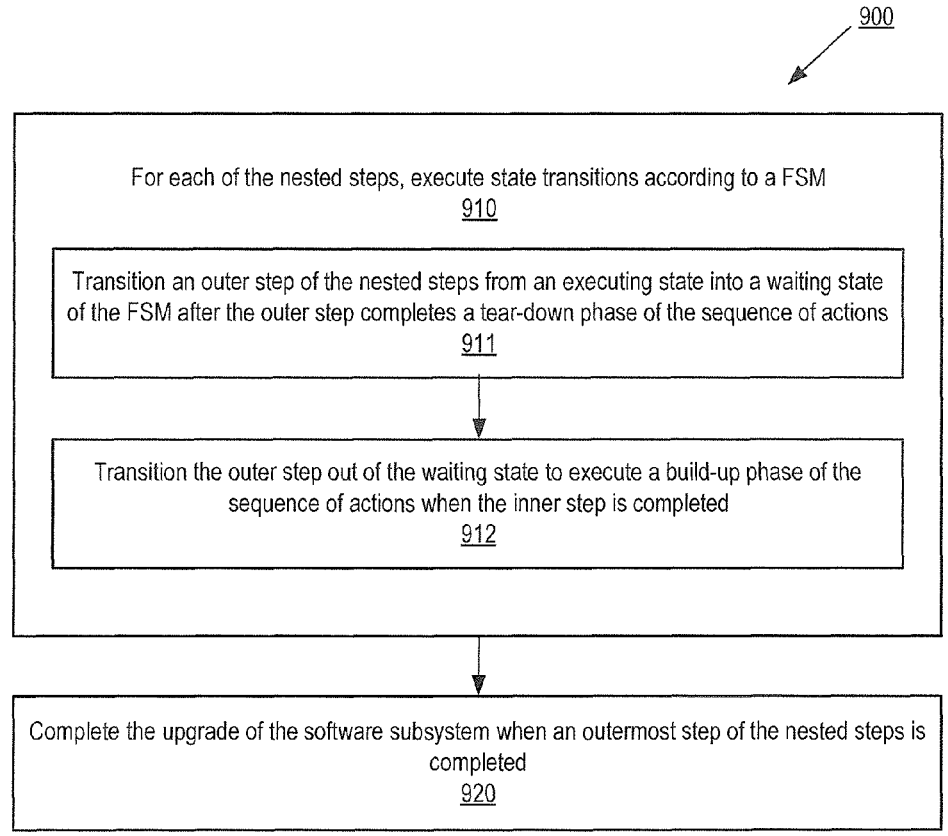
FIG. 9 illustrates a flow diagram of a method for embedded step execution, according to one embodiment of the invention.

FIG. 9 illustrates a method 900 for executing an embedded step for upgrading multiple layers of a system, according to one embodiment of the invention. The embedded step includes multiple nested steps, and each of the nested steps includes a sequence of actions for upgrading one of the layers. The method 900 may be performed by a computer system, such as a computer system 1000 that executes an upgrade campaign engine module to be described below with reference to FIG. 10. One or more parts of an embodiment of the invention may be implemented using different combinations of software, firmware, and/or hardware.

In one embodiment, the method 900 begins with the computer system 1000 performing state transitions according to a FSM for each of the nested steps (block 910). During the execution of the nested steps, an outer step of the nested steps is transitioned from an executing state into a waiting state of the FSM after the outer step completes a tear-down phase of the sequence of actions (block 911). During the transitioning of the outer step, the outer step sends a trigger to an inner step of the nested steps to cause the inner step to transition into the executing state. When the inner step is completed, the outer step is transitioned out of the waiting state to execute a build-up phase of the sequence of actions (block 912). The computer system 1000 completes the execution of the embedded step when an outermost step of the nested steps is completed (block 920).

Figure 10:
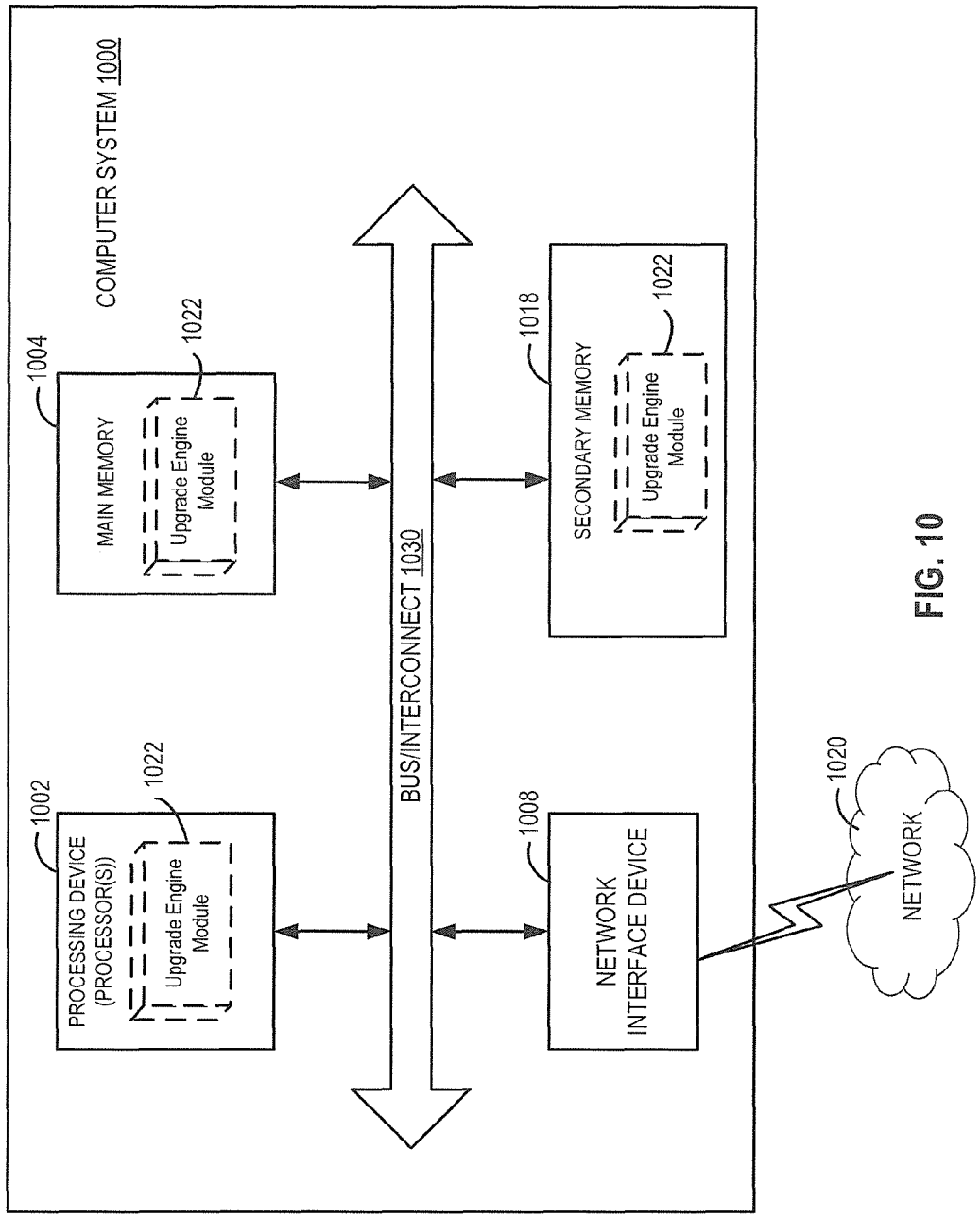
FIG. 10 illustrates an exemplary computer system according to one embodiment of the invention.

FIG. 10 illustrates a diagrammatic representation of a machine in the exemplary form of a computer system 1000 within which a set of instructions, for causing the machine to perform any one or more of the methodologies discussed herein, may be executed. The computer system 1000 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002. The processing device 1002 represents one or more general-purpose processors, each of which can be: a microprocessor, a central processing unit (CPU), a multicore system, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted to execute the operations of an upgrade engine module 1022, which may be the upgrade engine 120 as described above in connection with FIG. 1.

Although the embodiment of FIG. 10 shows a single processing device, it is appreciated that in some embodiments multiple processors of one or more processing devices 1002 may form a cluster and be inter-connected over a network, such as a local area network, a wide area network, or a combination thereof.

In one embodiment, the processor device 1002 is coupled to one or more memory devices such as: a main memory 1004 (e.g., read-only memory (ROM), flash memory, dynamic random access memory (DRAM) such as synchronous DRAM (SDRAM) or Rambus DRAM (RDRAM), etc.), a secondary memory 1018 (e.g., a magnetic data storage device, an optical magnetic data storage device, etc.), and other forms of computer-readable media, which communicate with each other via a bus or interconnect 1030. The memory devices may also different forms of read-only memories (ROMs), different forms of random access memories (RAMs), static random access memory (SRAM), or any type of media suitable for storing electronic instructions. In one embodiment, the memory devices may store the code and data of the upgrade engine 120 described above in connection with FIG. 1. In the embodiment of FIG. 10, the upgrade engine module 1022 may be located in one or more of the locations shown as dotted boxes and labeled by the reference numeral 1022.

The computer system 1000 may further include a network interface device 1008. A part or all of the data and code of the upgrade engine module 1022 may be transmitted or received over a network 1020 via the network interface device 1008. Although not shown in FIG. 10, the computer system 1000 also may include user input/output devices (e.g., a keyboard, a touchscreen, speakers, and/or a display).

In one embodiment, the upgrade engine module 1022 can be implemented using code and data stored and executed on one or more computer systems (e.g., the computer system 1000). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices as shown in FIG. 10 as 1004 and 1018) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system. One or more parts of an embodiment of the invention may be implemented using different combinations of software, firmware, and/or hardware.

The operations of the method of FIG. 9 have been described with reference to the exemplary embodiment of FIGS. 1 and 10. However, it should be understood that the operations of the method of FIG. 9 can be performed by embodiments of the invention other than those discussed with reference to FIGS. 1 and 10, and the embodiment discussed with reference to FIGS. 1 and 10 can perform operations different from those discussed with reference to the method of FIG. 9. While the method of FIG. 9 shows a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., computers, servers, mobile devices, etc.). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a computer system for executing an embedded step to upgrade a plurality of layers in a software subsystem, the embedded step including a plurality of nested upgrade steps, each of the plurality of nested upgrade steps including a sequence of actions for upgrading one of the plurality of layers, the method comprising the steps of:

executing, by the computer system for the each of the plurality of nested upgrade steps, state transitions according to a finite state machine (FSM), wherein the step of executing further comprises:
transitioning an outer step of the plurality of nested upgrade steps from an executing state into a waiting state of the FSM after the outer step completes a tear-down phase of the sequence of actions, wherein, during the transitioning of the outer step, the outer step sends a trigger to an inner step of the plurality of nested upgrade steps to cause the inner step to transition into the executing state, where at least one of the plurality of nested upgrade steps is locked reduced upgrade step, which includes actions that lock a symmetric activation unit and unlocks the symmetric activation unit and the symmetric activation unit includes entities that are de-activated and reactivated by the upgrade; and
transitioning the outer step out of the waiting state to execute a build-up phase of the sequence of actions when the inner step is completed; and
completing the execution of the embedded step when an outermost step of the plurality of nested upgrade steps is completed.

2. The method of claim 1, further comprising the steps of:
detecting that an error occurs in a given one of the plurality of nested upgrade steps during the upgrade;
retrying the given nested upgrade step in a same phase in which the error occurs; and
if a number of retries reaches a predetermined number without success, undoing the upgrade for each of the nested upgrade steps.

3. The method of claim 2, wherein subsequent to the predetermined number of retries, the method further comprises the step of:
transitioning the given nested upgrade step into a partial undone state of the FSM to wait for all of its inner steps to undo the upgrade.

4. The method of claim 1, wherein, in response to a rollback trigger, the method further comprises the steps of:
transitioning the outer step into a rollback waiting state of the FSM after the outer step rolled back the build-up phase, wherein, during the transitioning of the outer step, the outer step sends another trigger to the inner step to cause the inner step to roll back; and
transitioning the outer step out of the rollback waiting state to roll back the tear-down phase when the inner step has rolled back.

5. The method of claim 4, further comprising the steps of:
detecting that an error occurs during the rollback of a given one of the plurality of nested upgrade steps;
retrying the given nested upgrade step in a same phase in which the error occurs; and if a number of retries reaches a predetermined number without success, ending the rollback without all of the plurality of nested upgrade steps being in a same state of the FSM.

6. The method of claim 1, wherein the plurality of nested upgrade steps include a hardware layer.

7. The method of claim 1, wherein the plurality of nested upgrade steps include an operating system layer.

8. The method of claim 1, wherein the plurality of nested upgrade steps include one or more selected from a group consisting of:
an in-phase normal step, an out-of-phase normal step, a reduced upgrade step, and a locked reduced upgrade step.

9. The method of claim 1, further comprising the step of:
extending a schema for embedded steps that upgrade the software subsystem to specify each embedded step to include one or more nested upgrade steps.

10. A computer system adapted to execute an embedded step to upgrade a plurality of layers in a software subsystem, the embedded step including a plurality of nested upgrade steps, each of the plurality of nested upgrade steps including a sequence of actions for upgrading one of the plurality of layers, the computer system comprising:
one or more processors;
one or more memory devices coupled to the one or more processors; and
an upgrade engine coupled to the one or more processors and the one or more memory devices, the upgrade engine adapted to:
execute, for the each of the plurality of nested upgrade steps, state transitions according to a finite state machine (FSM), the upgrade engine is further adapted to:
transition an outer step of the plurality of nested upgrade steps from an executing state into a waiting state of the FSM after the outer step completes a tear-down phase of the sequence of actions, wherein, during the transitioning of the outer step, the outer step sends a trigger to an inner step of the plurality of nested upgrade steps to cause the inner step to transition into the executing state, where at least one of the plurality of nested upgrade steps is locked reduced upgrade step, which includes actions that lock a symmetric activation unit and unlocks the symmetric activation unit and the symmetric activation unit includes entities that are de-activated and reactivated by the upgrade; and
transition the outer step out of the waiting state to execute a build-up phase of the sequence of actions when the inner step is completed; and
complete the execution of the embedded step when an outermost step of the plurality of nested upgrade steps is completed.

11. The computer system of claim 10, wherein the upgrade engine is further adapted to:
detect that an error occurs in a given one of the plurality of nested upgrade steps during the upgrade;
retry the given nested upgrade step in a same phase in which the error occurs; and
if a number of retries reaches a predetermined number without success, undo the upgrade for each of the plurality of nested upgrade steps.

12. The computer system of claim 11, wherein subsequent to the predetermined number of retries, the upgrade engine is further adapted to transition the given nested upgrade step into a partial undone state of the FSM to wait for all of its inner steps to undo the upgrade.

13. The computer system of claim 10, wherein, in response to a rollback trigger, the upgrade engine is further adapted to:
transition the outer step into a rollback waiting state of the FSM after the outer step rolled back the build-up phase, wherein, during the transitioning of the outer step, the outer step sends another trigger to the inner step to cause the inner step to roll back; and
transition the outer step out of the rollback waiting state to roll back the tear-down phase when the inner step has rolled back.

14. The computer system of claim 13, wherein the upgrade engine is further adapted to:
detect that an error occurs during the rollback of a given one of the plurality of nested upgrade steps;
retry the given nested upgrade step in a same phase in which the error occurs; and
if a number of retries reaches a predetermined number without success, ending the rollback without all of the plurality of nested upgrade steps being in a same state of the FSM.

15. The computer system of claim 10, wherein the plurality of nested upgrade steps include a hardware layer.

16. The computer system of claim 10, wherein the plurality of nested upgrade steps include an operating system layer.

17. The computer system of claim 10, wherein the plurality of nested upgrade steps include one or more selected from a group consisting of:
an in-phase normal step, an out-of-phase normal step, a reduced upgrade step, and a locked reduced upgrade step.

18. The computer system of claim 10, wherein the embedded step is defined according to a schema that specifies the embedded step to include one or more nested upgrade steps.

* * * * *